United States Patent
Kuang

(10) Patent No.: US 7,760,883 B2
(45) Date of Patent: Jul. 20, 2010

(54) ANY-POINT-TO-ANY-POINT (AP2AP) QUANTUM KEY DISTRIBUTION PROTOCOL FOR OPTICAL RING NETWORK

(75) Inventor: Randy Kuang, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1022 days.

(21) Appl. No.: 11/481,906

(22) Filed: Jul. 7, 2006

(65) Prior Publication Data

US 2007/0076883 A1 Apr. 5, 2007

Related U.S. Application Data

(63) Continuation of application No. PCT/CA2006/000646, filed on Apr. 24, 2006, and a continuation-in-part of application No. 11/241,140, filed on Sep. 30, 2005.

(60) Provisional application No. 60/966,522, filed on Sep. 30, 2005.

(51) Int. Cl.
  *H04L 9/08* (2006.01)
(52) U.S. Cl. .................... 380/278; 380/283
(58) Field of Classification Search .......... 380/30, 380/255–256, 277–286, 44–47; 398/183–184, 398/188

See application file for complete search history.

(56) References Cited

U.S. PATENT DOCUMENTS

| | | | |
|---|---|---|---|
| 5,675,648 | A | 10/1997 | Townsend |
| 5,732,139 | A | 3/1998 | Lo et al. |

(Continued)

FOREIGN PATENT DOCUMENTS

WO 2006/000644 8/2006

(Continued)

OTHER PUBLICATIONS

Arda, A Quantum Information Science and Technology Roadmap, Jul. 19, 2004, 17 pages, Version 1.0, United States of Amercia, http://qist.lanl.gov.

(Continued)

*Primary Examiner*—Matthew B Smithers
*Assistant Examiner*—Jing Sims

(57) ABSTRACT

Apparatus for distributing a quantum key between nodes Alice and Allie, comprising a coupler that splits generated photon pulses into first and second pulses P1 and P2; and an interface that transmits the P1's and P2's into a network. The P1's are received after modulation by Alice with respective phases selected from two encoding bases and further selected from within the selected encoding basis as a function of a bit value of a respective bit in a key bit string maintained by Alice. The P2's are received after similar modulation by Allie. A detector processes the P1's and P2's upon receipt to produce a sequence of detection outcomes indicative of phase mismatch between the P1's and corresponding P2's. A control unit receives an indication of occurrences of a match between the encoding bases employed by Alice and the encoding bases employed by Allie, derives an XOR bit string from those detection outcomes that are associated with occurrences of a match, and communicates the XOR bit string to Alice and/or Allie. Execution of an XOR between the XOR bit string and either Alice's or Allie's key bit string allows the two participants to form a shifted key.

24 Claims, 4 Drawing Sheets

U.S. PATENT DOCUMENTS

| | | | |
|---|---|---|---|
| 5,764,765 | A | 6/1998 | Phoenix et al. |
| 5,768,378 | A | 6/1998 | Townsend et al. |
| 5,953,421 | A * | 9/1999 | Townsend .................. 380/283 |
| 6,188,768 | B1 | 2/2001 | Bethune et al. |
| 6,438,234 | B1 | 8/2002 | Gisin et al. |
| 6,678,379 | B1 | 1/2004 | Mayers et al. |
| 6,801,626 | B1 | 10/2004 | Nambu |
| 7,233,672 | B2 | 6/2007 | Mitchell et al. |
| 7,570,767 | B2 | 8/2009 | Lo |
| 2002/0097874 | A1 * | 7/2002 | Foden et al. ................. 380/256 |
| 2004/0161109 | A1 | 8/2004 | Trifonov |
| 2004/0190725 | A1 | 9/2004 | Yuan et al. |
| 2005/0135627 | A1 | 6/2005 | Zavriyev et al. |
| 2005/0190922 | A1 | 9/2005 | LaGasse |
| 2005/0286723 | A1 | 12/2005 | Vig et al. |
| 2006/0222180 | A1 | 10/2006 | Elliott |
| 2006/0239463 | A1 * | 10/2006 | Young ........................ 380/278 |

FOREIGN PATENT DOCUMENTS

| | | |
|---|---|---|
| WO | 2006/000645 | 8/2006 |
| WO | 2006/000646 | 8/2006 |
| WO | 2006/000647 | 8/2006 |

OTHER PUBLICATIONS

ID Quantique SA, Understanding Quantum Cryptography, Apr. 2005, 12 pages, Version 1-.0, Switzerland.

James Ford, Quantum Cryptography Tutorial, May 16, 2005, 5 pages, http://www.cs.dartmouth.edu/~jford/crypto.html.

BB84 Demo, May 16, 2005, 3 pages, http://monet.mercersburg.edu/henle/bb84/demo.php.

Karen Kelly, Quantum decoys foil code-breaking attempts, Jul. 18, 2005, 3 pages, Univeristy of Toronto, Canada, http://www.news.utoronto.ca/bin6/050718-1521.asp.

Chris Muktar, Modern Quantum Cryptography, 11 pages, Department of Theoretical Physics, University of Manchester, United Kingdom.

Office Action mailed on Sep. 16, 2009 in connection with U.S. Appl. No. 11/235,134.

Office Action mailed on Oct. 29, 2009 in connection with U.S. Appl. No. 11/481,826.

* cited by examiner

B1 (0, π); B2 (π/2, 3π/2)

| Alice (102) | $\Phi_1$ | Allie (106) | $\Phi_2$ | ΔΦ at Bob ($\Delta\Phi=\Phi_1-\Phi_2$) | Detection Result |
|---|---|---|---|---|---|
| Base: B1; Key Bit Value: 0 | 0 | Base: B1; Key Bit Value: 0 | 0 | 0 | Detector 110 (Constructive Interference) |
| Base: B1; Key Bit Value: 0 | 0 | Base: B1; Key Bit Value: 1 | π | π | Detector 111 (Destructive Interference) |
| Base: B1; Key Bit Value: 1 | π | Base: B1; Key Bit Value: 0 | 0 | π | Detector 111 (Destructive Interference) |
| Base: B1; Key Bit Value: 1 | π | Base: B1; Key Bit Value: 1 | π | 0 | Detector 110 (Constructive Interference) |
| Base: B2; Key Bit Value: 0 | π/2 | Base: B2; Key Bit Value: 0 | π/2 | 0 | Detector 110 (Constructive Interference) |
| Base: B2; Key Bit Value: 0 | π/2 | Base: B2; Key Bit Value: 1 | 3π/2 | π | Detector 111 (Destructive Interference) |
| Base: B2; Key Bit Value: 1 | 3π/2 | Base: B2; Key Bit Value: 0 | π/2 | π | Detector 111 (Destructive Interference) |
| Base: B2; Key Bit Value: 1 | 3π/2 | Base: B2; Key Bit Value: 1 | 3π/2 | 0 | Detector 110 (Constructive Interference) |

| Alice (102) | $\Phi_1$ | Allie (106) | $\Phi_2$ | ΔΦ at Bob (ΔΦ=Φ1−Φ2) | Detection Result |
|---|---|---|---|---|---|
| Base: B1; Key Bit Value: 0 | 0 | Base: B2; Key Bit Value: 0 | π/2 | 3π/2 | Random: Either 110 or 111 or Both |
| Base: B1; Key Bit Value: 0 | 0 | Base: B2; Key Bit Value: 1 | 3π/2 | π/2 | Random: Either 110 or 111 or Both |
| Base: B1; Key Bit Value: 1 | π | Base: B2; Key Bit Value: 0 | π/2 | π/2 | Random: Either 110 or 111 or Both |
| Base: B1; Key Bit Value: 1 | π | Base: B2; Key Bit Value: 1 | 3π/2 | 3π/2 | Random: Either 110 or 111 or Both |
| Base: B2; Key Bit Value: 0 | π/2 | Base: B1; Key Bit Value: 0 | 0 | π/2 | Random: Either 110 or 111 or Both |
| Base: B2; Key Bit Value: 0 | π/2 | Base: B1; Key Bit Value: 1 | π | 3π/2 | Random: Either 110 or 111 or Both |
| Base: B2; Key Bit Value: 1 | 3π/2 | Base: B1; Key Bit Value: 0 | 0 | 3π/2 | Random: Either 110 or 111 or Both |
| Base: B2; Key Bit Value: 1 | 3π/2 | Base: B1; Key Bit Value: 1 | π | π/2 | Random: Either 110 or 111 or Both |

FIG. 4

ANY-POINT-TO-ANY-POINT (AP2AP) QUANTUM KEY DISTRIBUTION PROTOCOL FOR OPTICAL RING NETWORK

CROSS-REFERENCE TO RELATED APPLICATIONS

The present application is a CONTINUATION under 35 USC §120 of PCT International Patent Application bearing Serial No. PCT/CA2006/000646, filed on Apr. 24, 2006, and hereby incorporated by reference; the present application also claims the benefit of priority under 35 USC §119(e) of U.S. Provisional Patent Application Ser. No. 60/966,522, filed on Sep. 30, 2005, and incorporated herein by reference.

The present application claims the benefit under 35 USC §120, and is a CONTINUATION-IN-PART, of U.S. patent application Ser. No. 11/241,140 to Kuang, filed on Sep. 30, 2005, hereby incorporated by reference herein.

FIELD OF THE INVENTION

This invention relates generally to the field of network communications, and more particularly to communications over a quantum channel.

BACKGROUND OF THE INVENTION

Public key encryption is currently a popular technique for secure network communications. Public key encryption utilizes "one-way functions" that are relatively simple for computers to calculate, but difficult to reverse calculate. In particular, a one way function $f(x)$ is relatively easy for a computer to calculate given the variable x, but calculating x given f(x) is difficult for the computer, although not necessarily impossible. Some one way functions can be much more easily reverse calculated with the assistance of particular "trap door" information, i.e., a key. Public key cryptography utilizes such one-way functions in a two-key system in which one key is used for encryption and the other key is used for decryption. In particular, the one-way function is a "public key" which is openly advertised by Node A for the purposes of sending encrypted messages to Node A. The trap door key is a "private key" which is held in confidence by Node A for decrypting the messages sent to Node A. For two-way encrypted communications each node utilizes a different public key and a different private key. One advantage of this system is that secure key distribution is not required. However, advances in the capabilities of computers tend to erode the level of security provided by public key encryption because the difficulty of reverse calculating the one-way function decreases as computing capabilities increase.

It is generally accepted in the field of cryptology that the most secure encryption technique is the Vernam cipher, i.e., one-time pad. A Vernam cipher employs a key to encrypt a message that the intended recipient decrypts with an identical key. The encrypted message is secure provided that the key is random, at least equal to the message in length, used for only a single message, and known only to the sender and intended receiver. However, in modern communication networks the distribution of Vernam cipher keys is often impractical, e.g., because the keys can be quite long and key distribution itself is subject to eavesdropping.

One technique for secure key distribution is known as Quantum Key Distribution ("QKD"). Particular Quantum Key Distribution protocols such as BB84 enable secure key exchange between two devices by representing each bit of a key with a single photon. Photons may be polarization-modulated in order to differentiate between logic 1 and logic 0. Distribution of the quantum keys is secure because, in accordance with the laws of quantum physics, an eavesdropper attempting to intercept the key would introduce detectable errors into the key since it is not possible to measure an unknown quantum state of a photon without modifying it. However, the network resources required to implement QKD are relatively costly. In particular, each network device that implements current QKD techniques requires a photon source and a photon detector.

SUMMARY OF THE INVENTION

In accordance with a first broad aspect, the present invention seeks to provide an apparatus for distributing a quantum key between a first node and a second node in a communications network. The apparatus comprises a photon source operable to generate a sequence of source pulses; a coupler operable to split each of the source pulses into a respective first pulse and a respective second pulse; an interface operable to (i) transmit the first pulses and the second pulses into the network; (ii) receive the first pulses after modulation by the first node with respective phases each selected from one of two encoding bases and further selected from within the selected encoding basis as a function of a bit value of a respective bit in a first key bit string; and (iii) receive the second pulses after modulation by the second node with respective phases each selected from one of the two encoding bases and further selected from within the selected encoding basis as a function of a bit value of a respective bit in a second key bit string. The apparatus further comprises a detection unit operable to process the received first pulses and the received second pulses in order to produce a sequence of detection outcomes indicative of phase mismatch between the received first pulses and corresponding ones of the received second pulses. The apparatus further comprises a control unit operable to receive from at least one of the first node and the second node an indication of occurrences of a match between the encoding bases employed by the first node and the encoding bases employed by the second node, the control unit further operable to derive an XOR bit string from those detection outcomes in the sequence of detection outcomes that are associated with occurrences of a match, and to communicate the XOR bit string to at least one of the first and second nodes. The XOR bit string is such that execution of an XOR between the XOR bit string and the respective key bit string of one of the first and second nodes allows the first and second nodes to form a shifted key.

In accordance with a second broad aspect, the present invention seeks to provide an apparatus for distributing a quantum key between a first node and a second node in a communications network. The apparatus comprises means for generating a sequence of source pulses; means for splitting each of the source pulses into a respective first pulse and a respective second pulse; means for transmitting the first pulses and the second pulses into the network; means for receiving the first pulses after modulation by the first node with respective phases each selected from one of two encoding bases and further selected from within the selected encoding basis as a function of a bit value of a respective bit in a first key bit string; means for receiving the second pulses after modulation by the second node with respective phases each selected from one of the two encoding bases and further selected from within the selected encoding basis as a function of a bit value of a respective bit in a second key bit string; means for processing the received first pulses and the received second pulses in order to produce a sequence of detection outcomes indicative of phase mismatch between the received first pulses and corresponding ones of the received second pulses; means for receiving from at least one of the first node and the second node an indication of occurrences of a match between the encoding bases employed by the first node and the encoding bases employed by the second node; means for deriving an XOR bit string from those detection outcomes in the sequence of detection outcomes that are associated with occurrences of a match; and means for communicating the XOR bit string to at least one of the first and second nodes, wherein the XOR bit string is such that execution of an XOR between the XOR bit string and the respective key bit string of one of the first and second nodes allows the first and second nodes to form a shifted key.

In accordance with a third broad aspect, the present invention seeks to provide a method for using resources of an enabler node to distribute a quantum key between a first node and a second node in a communications network. The method comprises, by the enabler node: generating a sequence of source pulses; splitting the source pulses into respective first pulses and respective second pulses; transmitting the first pulses and the second pulses into the network. The method further comprises, by the first node: modulating the first pulses with respective phases each selected from one of two encoding bases and further selected from within the selected encoding basis as a function of a bit value of a respective bit in a first key bit string. The method further comprises, by the second node: modulating the second pulses with respective phases each selected from one of the two encoding bases and further selected from within the selected encoding basis as a function of a bit value of a respective bit in a second key bit string. The method further comprises, by the enabler node: receiving the modulated first pulses and the modulated second pulses; receiving from at least one of the first node and the second node an indication of occurrences of a match between the encoding bases employed by the first node and the encoding bases employed by the second node; processing the received first pulses and the received second pulses in order to produce a sequence of detection outcomes indicative of phase mismatch between the received first pulses and corresponding ones of the received second pulses; communicating an XOR bit string to at least one of the first and second nodes, the XOR bit string being derived from those detection outcomes in the sequence of detection outcomes that are associated with occurrences of a match. The method further comprises, by one of the first node and the second node: executing an XOR between the XOR bit string and the respective key bit string of the one of the first and second nodes to form a shifted key in cooperation with the other of the first and second nodes.

In accordance with a fourth broad aspect, the present invention seeks to provide a network, comprising: an enabler node having photon generation resources and a photon detection resources; a first participant node and a second participant node, wherein at least one of the first participant node and the second participant node lacks at least one of (i) photon generation resources and (ii) photon detection resources. The network is further characterized by the enabler node being communicatively coupled to the first participant node and to the second participant node by a channel. The network is further characterized by the enabler node providing its photon generation resources and its photon detection resources on behalf of the first participant node and the second participant node to enable the first participant node and the second participant node to securely distribute a quantum key therebetween.

It will thus be appreciated by persons skilled in the art that quantum key distribution in accordance with certain embodiments of the invention obviates the need for the network nodes in a QKD pair to have a photon source and a photon detector. In particular, a designated QKD node with a photon detector and photon source employs those resources on behalf of node pair to establish a key for the node pair. Since the QKD node can perform QKD services on behalf of any of various node pairs in the network, a single set of relatively costly photon source and photon detector resources can be leveraged to support a relatively large number of lower cost devices. Further, the QKD node need not be fully trusted by the node pair because the QKD node does not learn the key in the course of supporting QKD for the node pair. Further, the QKD node can detect attempted eavesdropping by modulating a secret phase key into one of the pulses prior to transmission and modulating the same secret phase key into the other pulse after its returning to the QKD node.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 3 is a table illustrating various scenarios where there is a mismatch between the quantum encoding bases used by quantum participant nodes Alice and Allie;

FIG. 4 is a table illustrating various scenarios where there is a match between the quantum encoding bases used by Alice and Allie.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
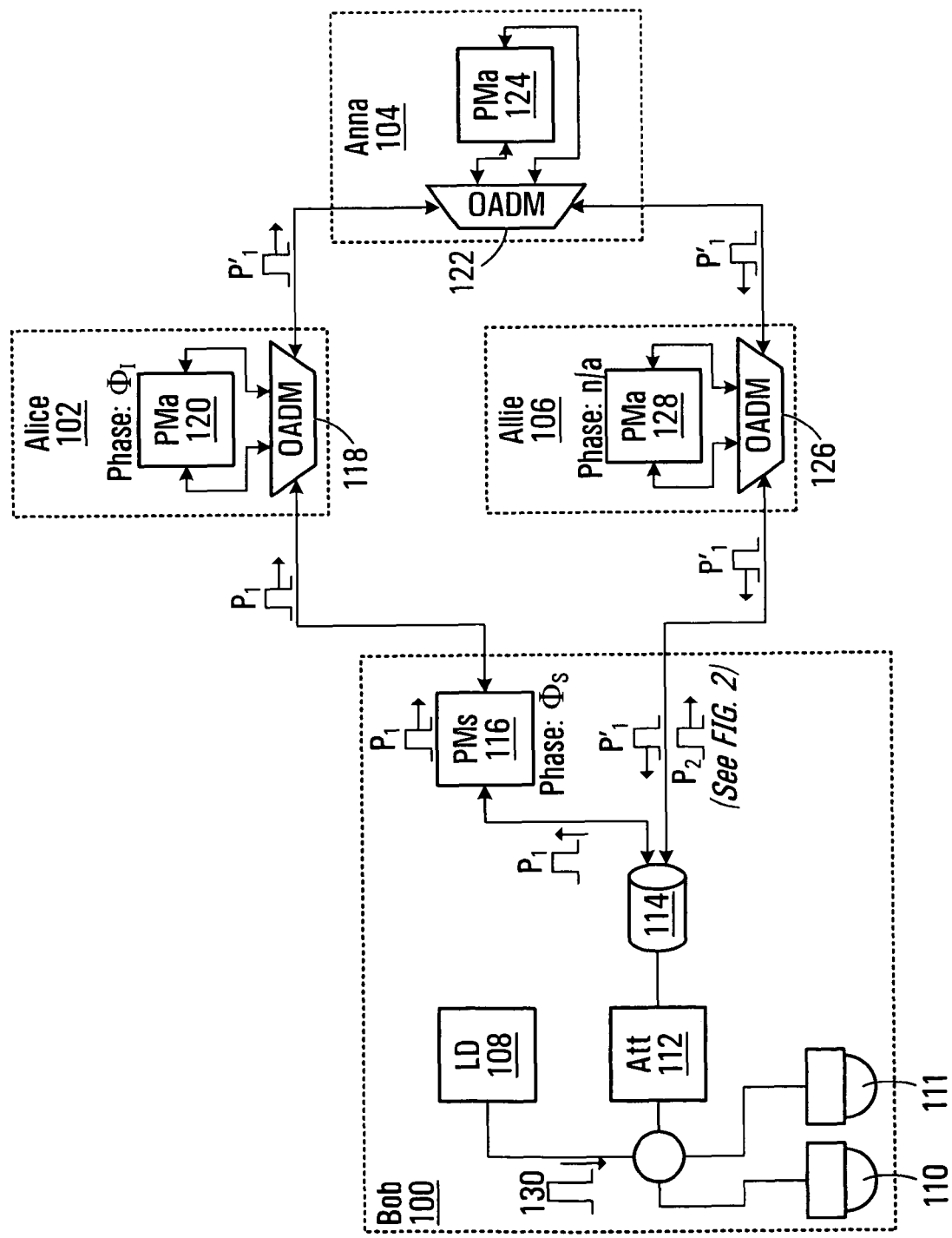
FIG. 1 is a block diagram illustrating travel of a first sub-pulse from a quantum enabler node "Bob" to a quantum participant node "Alice" and back to Bob.

FIG. 1 illustrates an optical ring network with a plurality of nodes, including a quantum enabler node (hereinafter referred to as "Bob") 100, a first potential quantum participant node (hereinafter referred to as "Alice") 102, a second potential quantum participant node (hereinafter referred to as "Anna") 104, and a third potential quantum participant node (hereinafter referred to as "Allie") 106. Bob 100 includes a photon source such as a laser diode 108, a detection unit (including a detector 110 triggered by a pulse affected with constructive interference and a detector 111 triggered by a pulse affected with destructive interference), an attenuator 112, a coupler (and/or beamsplitter) 114, and a phase modulator PMs 116. Each of Alice 102, Anna 104 and Allie 106 includes a respective Optical Add/Drop Multiplexer ("OADM") 118, 122, 126 and a respective phase modulator PMa 120, 124, 128.

Bob 100 functions as a Quantum Key Distribution ("QKD") enabler for pairs of quantum participant nodes in the network. In particular, node Bob 100 enables any pair of quantum participant nodes in the network to exchange quantum keys (i.e., to participate in QKD) even though those quantum participant nodes in the given pair may have neither a photon source nor a photon detector. Bob 100 accomplishes this task by transmitting corresponding pulses around the optical ring for independent modulation by the quantum participant nodes in the given pair, and then indicating correlation of the modulation to those quantum participant nodes.

In a non-limiting example embodiment, let Alice 102 and Allie 106 be desirous of participating in the distribution of a quantum key having a plurality of quantum key bits. Accordingly, both Alice 102 and Allie 106 each signal a request to node Bob 100 to participate in quantum key distribution. In response to the request, Bob 100 generates a source pulse 130 with the laser diode 108. The source pulse 130 is then attenuated by the attenuator 112 such that a suitable average number of photons per pulse is set. The attenuated source pulse is then split by the coupler 114, resulting in corresponding pulses hereinafter denoted pulse $P_1$ and pulse $P_2$.

Pulse $P_1$ is then phase-modulated using phase modulator PMs 116 with a secret phase key $\Phi_s$. The secret phase key $\Phi_s$ may be randomly generated such that it is unknown to parties other than Bob 100. Pulses $P_1$ and $P_2$ are transmitted over a quantum channel (e.g., an optical loop or fiber). More specifically, Bob 100 has an interface to the network that allows pulse $P_1$ to be transmitted from the coupler 114 in a first direction, i.e., clockwise toward Alice 102, with pulse $P_2$ being transmitted from the coupler 114 in a second direction, i.e., counter-clockwise toward Allie 106. Further, signaling from Bob 100 instructs Alice 102 to process pulse $P_1$ (and not pulse $P_2$), and Allie 106 to process pulse $P_2$ (and not pulse $P_1$).

Upon receipt of pulse $P_1$, Alice 102 is operable to drop pulse $P_1$ into an inner loop via the OADM 118. Alice 102 then modulates pulse $P_1$ using the phase modulator PMa 120. In particular, Alice 102 modulates pulse $P_1$ with a phase shift $\Phi_1$ that can be characterized by two components, namely a quantum encoding basis and a polarity. The quantum encoding basis is selected randomly from two quantum encoding bases, hereinafter denoted B1 (which has elements 0 and $\pi$) and B2 (which has elements $\lambda/2$, $3\pi/2$). As for the polarity, it is selected from the two elements in the selected quantum encoding basis, and the selected one of these two elements represents the bit value of a quantum key bit that Alice 102 wishes to encode. Thus, for example, if the quantum encoding basis for a given quantum key bit is B1, then a value of 0 in the given quantum key bit will set phase shift $\Phi_1$ equal to 0 and a value of 1 in the given quantum key bit will set phase shift $\Phi_1$ to $\pi$. Subsequent pulses $P_1$ will be modulated similarly, based on a key bit string maintained by Alice 102.

The encoded pulse, which is denoted $P'_1$ and has a phase shift $\Phi_s+\Phi_1$, is returned to the optical ring via the OADM 118. Anna 104 and Allie 106 in turn pass the encoded pulse $P'_1$ through their respective OADMs 122, 126. Hence, encoded pulse $P'_1$ eventually returns to node Bob 100, where it is directed to the coupler 114.

Figure 2:
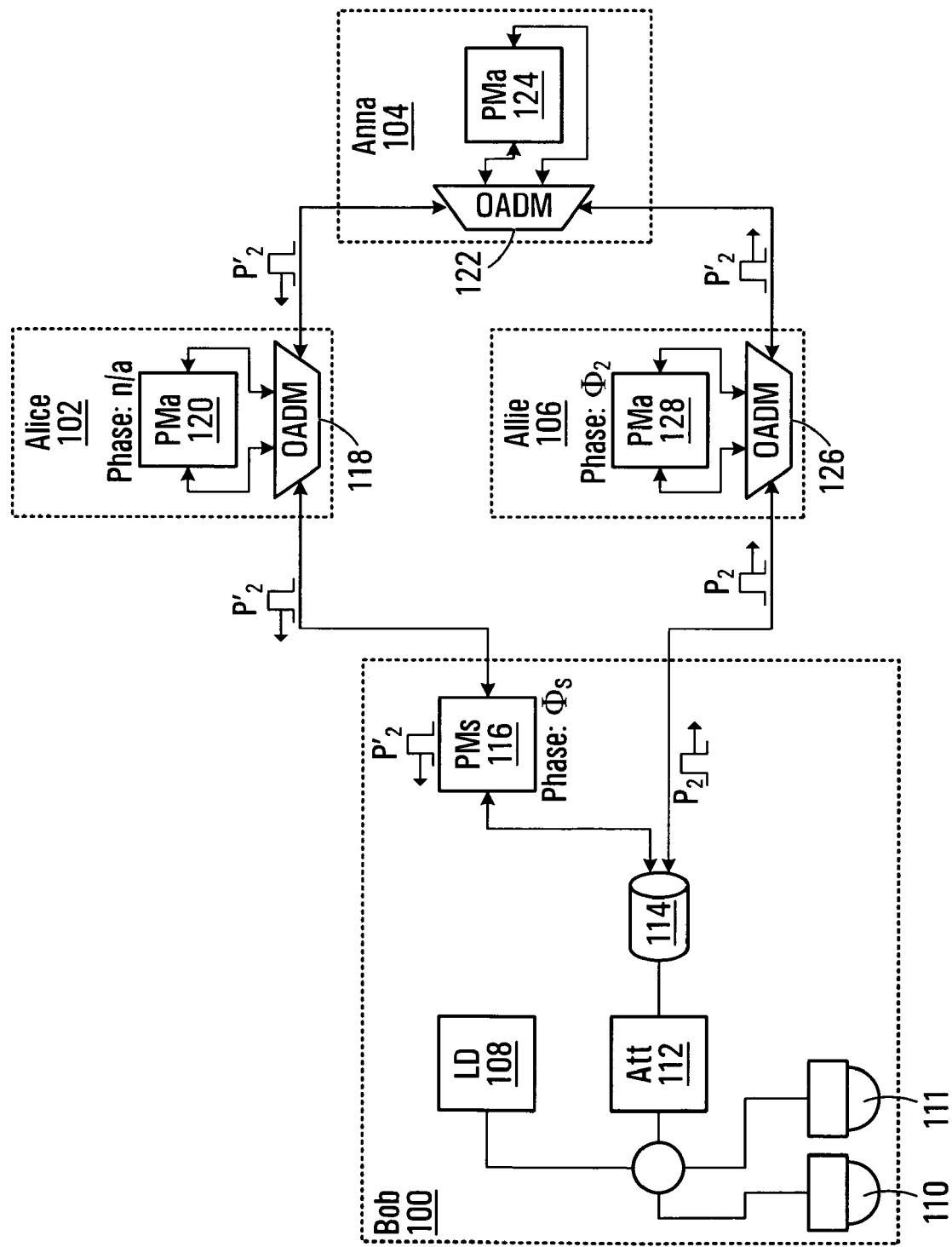
FIG. 2 is a block diagram illustrating travel of a second sub-pulse from Bob to a quantum participant node Allie and back to Bob.

Referring now to FIG. 2, in response to receipt of pulse $P_2$ from Bob 100, Allie 106 is operable to drop pulse $P_2$ into an inner loop via the OADM 126. Allie 106 then modulates pulse $P_2$ using the phase modulator PMa 128. In particular, Allie 106 modulates pulse $P_2$ with a phase shift $\Phi_2$ that can be characterized by two components, namely a quantum encoding basis and a polarity. The quantum encoding basis is selected randomly from the aforementioned encoding bases B1 (which has elements 0 and $\pi$) and B2 (which has elements $\pi/2$, $3\pi/2$). As for the polarity, it is selected from the two elements in the selected quantum encoding basis, in accordance with a quantum key bit that Allie 106 wishes to encode. Thus, for example, if the quantum encoding basis for a given quantum key bit is B2, then a value of 0 in the given quantum key bit will set phase shift $\Phi_2$ equal to $\pi/2$ and a value of 1 in the given quantum key bit will set phase shift $\Phi_2$ to $3\pi/2$. Subsequent pulses $P_2$ will be modulated similarly, based on a key bit string maintained by Allie 106.

The encoded pulse, which is denoted $P'_2$ and has a phase shift $\Phi_2$, is returned to the optical ring via the OADM 126. Anna 104 and Alice 102 pass the encoded pulse $P'_2$ through their respective OADMs 122, 118. Hence, the encoded pulse $P'_2$ eventually returns to Bob 100.

Upon receipt of the encoded pulse $P'_2$, Bob 100 is operable to direct the encoded pulse $P'_2$ to phase modulator PMs 116, where the encoded pulse $P'_2$ is modulated with the aforementioned secret phase shift $\Phi_s$, resulting in the encoded pulse $P'_2$ having a total phase shift of $\Phi_s+\Phi_2$. The encoded pulse $P'_2$ is then directed to the coupler 114, where it is combined with the previously described encoded pulse $P'_1$. The phase difference between $P'_1$ and $P'_2$ at the coupler 114 is $\Delta\Phi=(\Phi_s+\Phi_2)-(\Phi_s+\Phi_1)=\Phi_2-\Phi_1$. When the two pulses $P'_1$ and $P'_2$ are combined into a composite pulse at the coupler 114, the overall phase shift of the composite pulse can have several outcomes, as now described.

Specifically, when the quantum encoding basis used by Alice's phase modulator PMa 120 matches the quantum encoding basis used by Allie's phase modulator PMa 128, the composite pulse will cause a measurement to be recorded at only one of the detectors (e.g., either detector 110 or detector 111). This is known as a "one-click". Under such circumstances, which of Bob's two detectors 110, 111 will record a measurement will depend only on whether the quantum key bit used by Alice 102 matches the quantum key bit used by Allie 106. Specifically, one skilled in the art will recognize that detector 110 records a measurement when the quantum key bit is the same (i.e., as a result of constructive interference affecting the composite pulse occurring when the phase shift $\Delta\Phi$ equals to 0) and detector 111 records a measurement when the quantum key bit is different (i.e., as a result of destructive interference affecting the composite pulse occurring when the phase shift $\Delta\Phi$ equals to $\pi$). FIG. 3 shows a table which outlines the various possible cases where a matching quantum encoding basis was used, and hence where the detection result is indicative of whether or not the same quantum key bit was used by Alice 102 and Allie 106.

However, when the quantum encoding basis used by Alice's phase modulator PMa 120 does not match the quantum encoding basis used by Allie's phase modulator PMa 128 (a situation referred to as a quantum basis mismatch), each photon in the composite pulse will be detected by either detector 110 or detector 111 with approximately equal probability (as the interference is neither strictly constructive nor strictly destructive), and may even result in a measurement being recorded at both of the detectors 110, 111. Under such circumstances, there is no relation between the measurements recorded at the detectors 110, 111 and the match or mismatch between the quantum key bit used by Alice 102 and the quantum key bit used by Allie 106. In short, the detection results cannot be relied upon to extract information. FIG. 4 shows a table which outlines the cases where the detection results cannot be relied upon to extract information due to quantum encoding basis mismatch. It will be seen that in each case, the phase shift $\Delta\Phi$ of the composite pulse is either $\pi/2$ or $3\pi/2$, which is considered neither constructive nor destructive interference.

It follows from the above that if Allie 106 were to know that the quantum encoding basis used by Allie's phase modulator PMa 128 matches the quantum encoding basis used by Alice's phase modulator 120, and if Allie 106 were further to know whether the quantum key bit used by Allie 106 is the same as or different from the quantum key bit used by Alice 102, then Allie 106 would instantly know the bit value of the quantum key bit used by Alice 102.

Similarly, if Alice 102 were to know that the quantum encoding basis used by Alice's phase modulator PMa 120 matches the quantum encoding basis used by Allie's phase modulator 128, and if Alice 102 were further to know whether the quantum key bit used by Alice 102 is the same as or different from the quantum key bit used by Allie 106, then Alice 102 would instantly know the bit value of the quantum key bit used by Allie 106.

In order for Allie 106 (or alternatively Alice 102) to obtain the aforesaid knowledge of whether the correct quantum encoding basis was used in the first place, Allie 106 (or alternatively Alice 102) signals to her counterpart, Alice 102 (or alternatively Allie 106) and the quantum enabler node (Bob 100) to indicate the sequence of quantum encoding bases that were used by Allie 106 (or alternatively Alice 102) for encoding the quantum key bits (for example, B1, B2, B2, B1, etc.). This can be done over a public (non-secure) channel if desired. Assume for the sake of simplicity that Allie 106 has performed this signaling operation.

Bob 100 now takes no further action until receiving a response signal from Alice 102. In particular, Alice 102 compares Allie's quantum encoding bases with her own quantum encoding bases and publicly identifies to Allie 106 and Bob 100 the pulses for which the quantum encoding bases match (or don't match). Bob 100, Alice 102 and Allie 106 then remove from consideration the quantum key bits associated with pulses for which there has been a mismatch between the quantum encoding bases used by Alice 102 and those used by Allie 106. Basically, one removes from consideration the possibilities in FIG. 4, leaving only the possibilities in FIG. 3 for further processing.

Next, Bob 100 signals to Allie 106 (or Alice 102) to indicate, for each of the remaining quantum key bits, those instances where a measurement result was obtained at detector 110 (i.e., the same quantum key bit was used by Alice 102 and Allie 106) and those instances where a measurement result was obtained at detector 111 (i.e., a different quantum key bit was used by Alice 102 and Allie 106). To this end, Bob's control logic can create an XOR bit string, where 0 denotes that no bit reversal is required (based on a measurement having been recorded at detector 110) and 1 that a bit reversal is required (based on a measurement having been recorded at detector 111). It should be noted that in neither case does Bob 100 know the actual bit values of the quantum key bits used by Alice 102 or Allie 106. Bob sends the XOR bit string to Allie 106 (or Alice 102).

Upon receipt of the XOR bit string from Bob 100, Allie 106 simply performs an "exclusive or" (XOR) operation between the received XOR bit string and the quantum key bits in Allie's key bit string (but only for those quantum key bits associated with pulses still under consideration). The result of the XOR operation will reveal to Allie 106 a set of quantum key bits having precisely the bit values of the quantum key bits in Alice's key bit string. This set of quantum key bits, which is now known to both Alice 102 and Allie 106, can be referred to as a shifted key. Further steps can be performed (such as BB84 error correction and privacy amplification) and a final secret key can be determined. Of course, the XOR operation could also have been performed by Alice 102, and it is within the scope of the present invention for Alice 102 and Allie 106 to negotiate which one of them will perform the XOR operation.

From the above, it will be apparent that a general advantage of certain embodiments of the invention is more efficient and practical distribution of a quantum key, where either or both parties to the distribution are missing the requisite pulse source and/or detector resources. Efficiency is enhanced because multiple photons can be used to represent each bit of the quantum key. Using multiple photons enable use of attenuator settings that are less likely to result in zero photons (complete attenuation).

Security against an "intercept-and-resend" attack is maintained because attempted eavesdropping can be detected from a phase mismatch being introduced by the attacking party (e.g., Anna 104). This gives rise to either (I) both detectors 110, 111 recording a measurement even though only one detector is expected to record a measurement; and/or (II) increased quantum bit error rate (QBER).

Security against a "photon-split" attack is maintained despite using multiple photons per pulse (where each individual photon in the pulse has 100% of the information of the encoded key bit value) due to the use of the secret phase key $\Phi$s. For example, a potential eavesdropper Anna 104 would need to decode the secret phase key $\Phi$s, split pulse $P_2$ (which is not modulated with the secret phase key $\Phi$s), split pulse $P_1$ (which is modulated with $\Phi$s), and then randomly modulate a phase to one of the pulses and combine two pulses to recreate the original photon or photons. However, because of the randomness of the modulation Anna 104 would require a relatively large number of attempts to reach the solution. Such a large number of attempts can be made unavailable to Anna 104 because Bob 100 attenuates the pulses to a certain level, such as $\mu=10$. Further, the eavesdropping attempts by Anna 104 will tend to increase the QBER, which can be detected by Bob 100.

Those skilled in the art will also appreciate that one result of the described technique is that Bob 100 does not learn the quantum key bits in the key bit strings used by Alice 102 and Allie 106. In particular, the participation and measurements of Bob 100 do not directly result in the bits of the quantum key, and thus while Bob facilitates QKD, he will never actually know the quantum key. Rather, as mentioned above, Bob's measurements reveal only the XOR between certain bits in Alice's key bit string and corresponding bits in Allie's key bit string. Consequently, Bob 100 need not be fully trusted by Alice 102 and Allie 106 in order to be utilized as an enabler for QKD. This aspect of the invention could be advantageous in shared networks.

While the invention is described through the above example embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for distributing a quantum key between a first node and a second node in a communications network, comprising:
   a photon source operable to generate a sequence of source pulses;
   a coupler operable to split each of the source pulses into a respective first pulse and a respective second pulse;
   an interface operable to:
      transmit the first pulses and the second pulses into the network;
      receive the first pulses after modulation by the first node with respective phases each selected from one of two encoding bases and further selected from within the selected encoding basis as a function of a bit value of a respective bit in a first key bit string; and receive the second pulses after modulation by the second node with respective phases each selected from one of said two encoding bases and further selected from within the selected encoding basis as a function of a bit value of a respective bit in a second key bit string;

a detection unit operable to combine the received first pulses and corresponding ones of the received second pulses into corresponding composite pulses and to process the composite pulses in order to produce a sequence of detection outcomes indicative of phase mismatch between the received first pulses and corresponding ones of the received second pulses;

a control unit operable to receive from at least one of the first node and the second node an indication of occurrences of a match between the encoding bases employed by the first node and the encoding bases employed by the second node, said control unit further operable to derive an XOR bit string from those detection outcomes in the sequence of detection outcomes that are associated with occurrences of a match, and to communicate said XOR bit string to at least one of the first and second nodes, the XOR bit string comprising bits each of which is either logic "0" to indicative a detection outcome produced from a composite pulse affected with constructive interference, or logic "1" to indicate a detection outcome produced from a composite pulse affected with destructive interference;

wherein execution of an XOR between the XOR bit string and the respective key bit string of one of the first and second nodes allows the first and second nodes to form a shifted key.

2. The apparatus defined in claim 1, wherein the communications network is a ring network, the interface being arranged such that the first pulses are directed in a first direction around the ring and the second pulses are directed in an opposite direction around the ring.

3. The apparatus defined in claim 1, further including a phase modulator operable to modulate each of the first pulses with a secret phase key before transmission thereof into the network.

4. The apparatus defined in claim 3, wherein the phase modulator is further operable, after receiving the second pulses from the network, to modulate the received second pulses with said secret phase key before the detection unit is employed to process the received first pulses and the received second pulses.

5. The apparatus defined in claim 1, the control unit being further operable to indicate potential eavesdropping based on a quantum bit error rate.

6. The apparatus defined in claim 1, further including an attenuator operable to reduce an average number of photons in the source pulses.

7. The apparatus defined in claim 1, wherein said two encoding bases include a first encoding basis defined by phase shifts of 0 and $\pi$ and a second encoding basis defined by phase shifts of $\pi/2$ and $3\pi/2$.

8. The apparatus defined in claim 1, wherein the control unit is further operable to remove from consideration those detection outcomes in the sequence of detection outcomes that are associated with occurrences of a mismatch.

9. Apparatus for distributing a quantum key between a first node and a second node in a communications network, comprising:

means for generating a sequence of source pulses;

means for splitting each of the source pulses into a respective first pulse and a respective second pulse;

means for transmitting the first pulses and the second pulses into the network;

means for receiving the first pulses after modulation by the first node with respective phases each selected from one of two encoding bases and further selected from within the selected encoding basis as a function of a respective bit in a first key bit string;

means for receiving the second pulses after modulation by the second node with respective phases each selected from one of said two encoding bases and further selected from within the selected encoding basis as a function of a bit value of a respective bit in a second key bit string;

means for combining the received first pulses and corresponding ones of the received second pulses into corresponding composite pulses and for processing the composite pulses in order to produce a sequence of detection outcomes indicative of phase mismatch between the received first pulses and corresponding ones of the received second pulses;

means for receiving from at least one of the first node and the second node an indication of occurrences of a match between the encoding bases employed by the first node and the encoding bases employed by the second node;

means for deriving an XOR bit string from those detection outcomes in the sequence of detection outcomes that are associated with occurrences of a match, the XOR bit string comprising bits each of which is either logic "0" to indicative a detection outcome produced from a composite pulse affected with constructive interference, or logic "1" to indicate a detection outcome produced from a composite pulse affected with destructive interference;

means for communicating said XOR bit string to at least one of the first and second nodes, wherein execution of an XOR between the XOR bit string and the respective key bit string of one of the first and second nodes allows the first and second nodes to form a shifted key.

10. A method for using resources of an enabler node to distribute a quantum key between a first node and a second node in a communications network, the method comprising:

by the enabler node:
generating a sequence of source pulses;
splitting the source pulses into respective first pulses and respective second pulses;
transmitting the first pulses and the second pulses into the network;

by the first node:
modulating the first pulses with respective phases each selected from one of two encoding bases and further selected from within the selected encoding basis as a function of a bit value of a respective bit in a first key bit string;

by the second node:
modulating the second pulses with respective phases each selected from one of said two encoding bases and further selected from within the selected encoding basis as a function of a bit value of a respective bit in a second key bit string;

by the enabler node:
receiving the modulated first pulses and the modulated second pulses;
receiving from at least one of the first node and the second node an indication of occurrences of a match between the encoding bases employed by the first node and the encoding bases employed by the second node;

combining the received first pulses and corresponding ones of the received second pulses into corresponding composite pulses;

processing the composite pulses in order to produce a sequence of detection outcomes indicative of phase mismatch between the received first pulses and corresponding ones of the received second pulses;

communicating an XOR bit string to at least one of the first and second nodes, the XOR bit string being derived from those detection outcomes in the sequence of detection outcomes that are associated with occurrences of a match, the XOR bit string comprising bits each of which is either logic "0" to indicative a detection outcome produced from a composite pulse affected with constructive interference, or logic "1" to indicate a detection outcome produced from a composite pulse affected with destructive interference;

by one of the first node and the second node:

executing an XOR between the XOR bit string and the respective key bit string of said one of the first and second nodes to form a shifted key in cooperation with the other of the first and second nodes.

11. The method defined in claim 10, wherein the communications network is a ring network, wherein transmitting the first pulses and the second pulses into the network comprises directing the first pulses in a first direction around the ring and directing the second pulses in an opposite direction around the ring.

12. The method defined in claim 10, further comprising the enabler node modulating each of the first pulses with a secret phase key before transmission thereof into the network.

13. The method defined in claim 12, further comprising the enabler node modulating the received second pulses with said secret phase key before the detection unit is employed to process the received first pulses and the received second pulses.

14. The method defined in claim 10, further comprising the enabler node indicating potential eavesdropping based on a quantum bit error rate.

15. The method defined in claim 10, further comprising the enabler node attenuating the source pulses to reduce an average number of photons in the source pulses.

16. The method defined in claim 10, wherein said two encoding bases include a first encoding basis defined by phase shifts of 0 and $\pi$ and a second encoding basis defined by phase shifts of $\pi/2$ and $3\pi/2$.

17. The method defined in claim 10, further comprising the enabler node removing from consideration those detection outcomes in the sequence of detection outcomes that are associated with occurrences of a mismatch.

18. The method defined in claim 10, further comprising the first node providing the second node with an indication of the encoding bases employed by the first node.

19. The method defined in claim 18, further comprising the first node providing the enabler node with said indication of the encoding bases employed by the first node.

20. The method defined in claim 19, further comprising the second node comparing the encoding bases employed by the second node with the encoding bases employed by the first node to identify occurrences of a match between the encoding bases employed by the first node and the encoding bases employed by the second node.

21. The method defined in claim 20, further comprising the second node providing the indication of occurrences of a match to said enabler node.

22. The method defined in claim 21, further comprising the second node providing the indication of occurrences of a match to said first node.

23. A network, comprising:

an enabler node having photon generation resources and a photon detection resources;

a first participant node;

a second participant node;

at least one of the first participant node and the second participant node lacking at least one of (i) photon generation resources and (ii) photon detection resources;

the enabler node communicatively coupled to the first participant node and to the second participant node by a channel;

the enabler node providing said photon generation resources and said photon detection resources on behalf of the first participant node and the second participant node to enable the first participant node and the second participant node to securely distribute a quantum key therebetween.

24. The network defined in claim 23, wherein said channel is a quantum channel.

* * * * *